(12) United States Patent
Carbonini et al.

(10) Patent No.: US 8,927,041 B2
(45) Date of Patent: Jan. 6, 2015

(54) BREW GROUP, MACHINE USING SAME, AND METHOD OF OPERATING MACHINE

(75) Inventors: Carlo Carbonini, Villastanza di Parabiago (IT); Giancarlo Porzio, Villastanza di Parabiago (IT)

(73) Assignee: Rancilio Group S.p.A., Villastanza di Parabiago (IT)

( * ) Notice: Subject to any disclaimer, the term of this patent is extended or adjusted under 35 U.S.C. 154(b) by 60 days.

(21) Appl. No.: 13/703,975

(22) PCT Filed: Mar. 24, 2011

(86) PCT No.: PCT/IB2011/051259
§ 371 (c)(1),
(2), (4) Date: Jan. 7, 2013

(87) PCT Pub. No.: WO2011/158131
PCT Pub. Date: Dec. 12, 2011

(65) Prior Publication Data
US 2013/0108755 A1  May 2, 2013

(30) Foreign Application Priority Data
Jun. 16, 2010  (IT) .............................. TO2010A0518

(51) Int. Cl.
*A47J 31/46*  (2006.01)
(52) U.S. Cl.
CPC ................ *A47J 31/46* (2013.01); *A47J 31/465* (2013.01)
USPC ............................. 426/433; 99/293; 99/300
(58) Field of Classification Search
CPC ..... A47J 31/0573; A47J 3/057; A47J 31/462; A47J 31/465; A23F 3/16; A23F 5/24; A23F 5/262
USPC ........................................ 426/433; 99/293, 300
See application file for complete search history.

(56) References Cited

U.S. PATENT DOCUMENTS

| 3,583,308 | A | * | 6/1971 | Williams | 99/302 R |
| 3,592,125 | A | * | 7/1971 | Tolmie et al. | 99/307 |
| 5,210,386 | A | * | 5/1993 | Sprunger | 219/689 |
| 8,607,690 | B1 | * | 12/2013 | Bresciani et al. | 99/281 |
| 2007/0277676 | A1 | * | 12/2007 | Crivellin | 99/288 |

FOREIGN PATENT DOCUMENTS

| EP | 0 797 945 A1 | 10/1997 |
| EP | 1 360 918 A1 | 11/2003 |
| EP | 2 133 011 A1 | 12/2009 |
| EP | 2 147 621 A1 | 1/2010 |
| FR | 2 907 649 A1 | 5/2008 |

OTHER PUBLICATIONS

International Search Report for PCT/IB2011/051259 dated Jul. 25, 2011.

* cited by examiner

*Primary Examiner* — Anthony Weier
(74) *Attorney, Agent, or Firm* — Sughrue Mion, PLLC

(57) ABSTRACT

This invention relates to a brew group for an infusion machine, in particular a machine for espresso coffee, having infusion means (43, 43*b*) designed for the preparation of infusions, a holding chamber (41) hydraulically connected to the said infusion means (43, 43*b*) and having at least two liquid inlets (411) allowing the delivery of liquids and heating means (46) capable of directly heating the liquids delivered to the holding chamber (41) through the inlets such as to hydraulically feed the infusion means (43, 43*b*) for the preparation of infusions. The invention also relates to a machine which includes the brew group and a method for operating the machine.

24 Claims, 6 Drawing Sheets

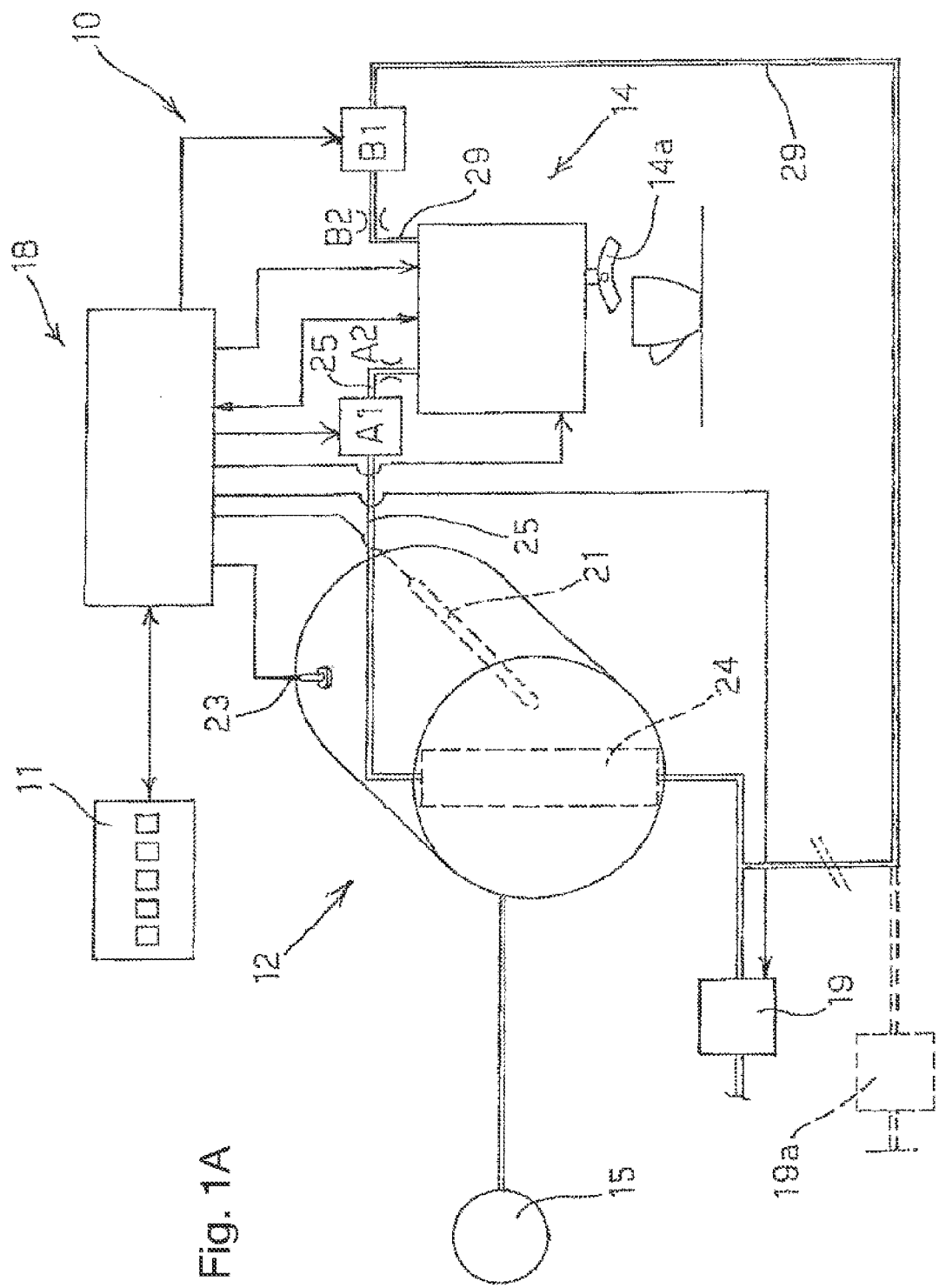

BREW GROUP, MACHINE USING SAME, AND METHOD OF OPERATING MACHINE

CROSS REFERENCE TO RELATED APPLICATIONS

This application is a National Stage of International Application No. PCT/IB2011/051259 filed Mar. 24, 2011, claiming priority based on Italian Patent Application No. TO2010A000518 filed Jun. 16, 2010, the contents of all of which are incorporated herein by reference in their entirety.

TECHNICAL SECTOR

This invention relates in general to a supply or brew group for a machine for the preparation of infusions based on coffee or barley. This invention refers in particular to a machine for the preparation of espresso coffee and similar infusions in which one or preferably more stages for heating the water or liquid required for preparation of the infusion are present and in which one of the stages comprises a brew group.

KNOWN ART

In general brew groups and machines for the preparation of infusions such as for example those for the preparation of espresso coffee, to which reference will be made hereafter for convenience of description, are known.

In general the known machines comprise a boiler and a brew group or infusion chamber for dispensing the espresso coffee, for example, into a coffee cup.

In the context of espresso coffee machines, machines which provide several stages to permit heating of the water required for preparation of the coffee are in particular known.

For example a machine for the preparation of espresso coffee in which there is provided a boiler as a first heating stage to raise the temperature of the water to values of between 95 and 98° C. and a heating element as a second heating stage included in the housing also comprising the infusion chamber and capable of maintaining the infusion chamber at a thermostatically controlled temperature are known for example from publication EP 0465877 A1, in the name of the Applicant.

A similar machine is also known from publication U.S. Pat. No. 5,551,331 in which it is in particular provided that the second stage is capable of increasing the temperature of the infusion chamber when a temperature sensor detects that the temperature therein has fallen below a predetermined value.

A machine for the preparation of espresso coffee in which provision is made for a brew group comprising a water heating chamber as the second stage and an infusion body comprising the base of the heating chamber is also known from publication EP 2133011 A1.

In the known machine it is provided that the water heating chamber is fed through a single conduit with water obtained by mixing cold water and hot water from the machine's boiler upstream of the brew group.

A problem common to all the known art is that the second heating stage associated with the infusion chamber as provided does not make it possible to optimise the coffee preparation temperature finely because of the thermal inertia phenomena which are typical in circumstances where an infusion chamber is heated indirectly through a heating device.

A further problem which is common to all the known art is that known machines comprising a second heating stage, presenting greater complexity in electrical and/or fluid connections, have infusion chambers or brew groups which are more complex and difficult to adapt to machine configurations that are diversified or have innovative functions.

In general the Applicant has found that none of the machines for the preparation of espresso coffee comprising one or more heating stages are capable of ensuring effective control of the coffee delivery temperature at all times.

The Applicant has also observed that none of the known machines provide second heating stages or brew groups offering great flexibility in installation and operation.

The Applicant has finally observed that none of the known machines succeed in fully optimising the electrical power required for their functioning because of the dimensions and configurations of their internal parts.

DESCRIPTION OF THE INVENTION

A first object of this invention is therefore to overcome the problems in the known art set out above, in particular the problem of instantaneous control of the coffee delivery temperature.

This object is accomplished through the improved brew group for the preparation of infusions, in particular espresso coffee, as claimed.

This invention also relates to a machine for the preparation of infusions and a method for operation of the machine itself.

The claims constitute an integral part of the technical teaching provided through the invention.

According to a preferred embodiment the brew group comprises a holding chamber having at least one inlet for cold water or spring water or, also, an aromatic liquid, and at least one inlet for heated water, originating from for example a boiler.

According to a variant embodiment the brew group comprises a holding chamber having at least two inlets for cold water or spring water which are at a distance from each other such as to permit instantaneous control of the coffee delivery temperature through one or more valves and suitably programmed heating means.

According to a further feature of this invention, the holding chamber is configured in such a way as to comprise an infusion chamber within it.

According to another feature of this invention the holding chamber comprises a quantity of liquid which is substantially equal to that necessary for preparation of the infusion.

According to yet another feature of this invention the holding chamber comprises means for heating liquid dimensioned in such a way that the infusion temperature can be dynamically controlled within a specific temperature range during the infusion stage.

SUMMARY DESCRIPTION OF THE FIGURES

These and other features and advantages of this invention will be clearly apparent from the following description of preferred embodiments provided by way of a non-limiting example with the help of the appended figures, in which elements indicated by the same or similar reference numbers indicate elements which have the same or similar functions and construction, and in which:

FIG. 1*a* shows a general diagram of an espresso coffee machine according to the invention;

FIG. 1*b* shows a general diagram of a variant of the espresso coffee machine according to the invention;

FIG. 1*c* shows a general diagram of a further variant of the espresso coffee machine according to the invention;

DESCRIPTION OF PREFERRED EMBODIMENTS

Figure 1B:
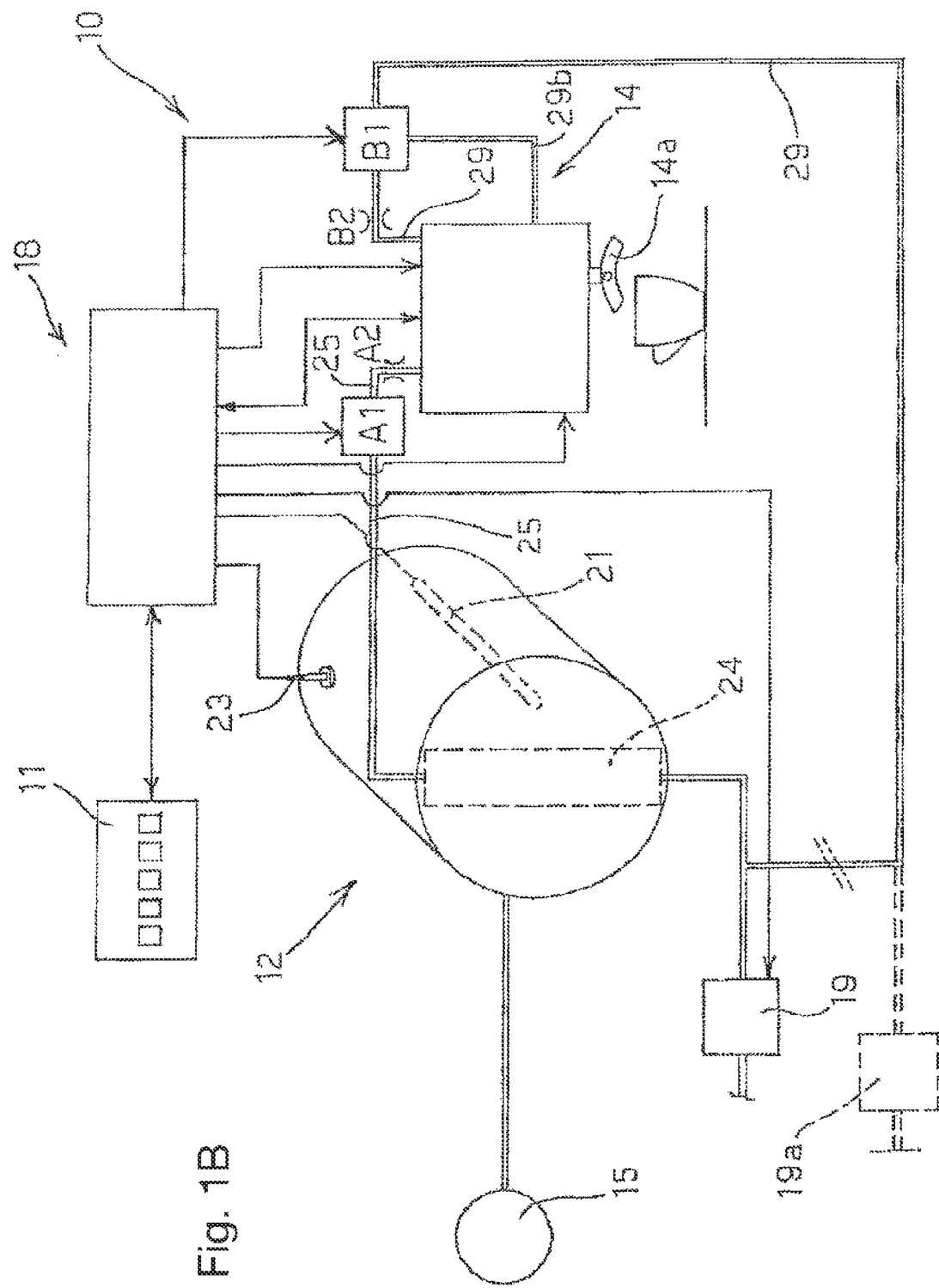

With reference to FIG. 1a an espresso coffee machine (machine) 10 according to a first embodiment comprises a boiler 12, one or more brew groups 14 which can be associated with respective filter holders, which when in use contain layers of coffee powder, and corresponding spouts 14a suitable for the preparation of espresso coffee.

Machine 10 also comprises one or more devices for delivering the so-called services (services devices) 15, such as for example devices for the delivery of hot water or steam services.

Machine 10 also comprises a user device or keyboard 11 for controlling the delivery of coffee and services and a control unit 18 which as will be seen described in detail below is configured to control the operation of boiler 12, brew groups 14 and services devices 15.

Boiler 12, of a known type, comprises in the preferred embodiment a heating unit 21 controlled in a known way by a sensor 23, for example a temperature sensor, from control unit 18 and is for example capable of directly feeding services devices 15 with hot water or steam.

Boiler 12 is preferably fed with mains water in a known way, which generally has a temperature of between 5 and 25° C.

In the first embodiment boiler 12 also comprises a heat exchange unit (heat exchanger) 24 fed with mains water by means of a pump 19, for example a metering pump; the heat exchanger is dimensioned in such a way as preferably to contain a volume of water or liquid of between 300 and 400 cc at a predetermined temperature and pressure.

Even more preferably heat exchanger 24 is in the case of a machine with 4 brew groups dimensioned in such a way as to contain a volume of water of approximately 350 cc; in the case where delivery takes place from heat exchanger 24 to brew group 14, the water in heat exchanger 24 leaves heat exchanger 24 at a temperature of for example between 105 and 115° C.

Heat exchanger 24 is connected by means of a conduit 25, of a known type, for example a thermally insulated copper pipe, to brew groups 14, of which a single unit 14 will be illustrated and described below, as these units are identical in the preferred embodiment.

Preferably a valve A1, for example an electrically-controlled valve, controlled by control unit 18 on the basis of programs developed during the design stage of machine 10 is provided in the course of first conduit 25.

In alternative embodiments valve A1 may be replaced or supplemented by restrictions A2, for example restrictions which have been calibrated, designed and checked experimentally.

In the first embodiment, pump 19 is also connected to brew group 14 through a second conduit 29, separate from first conduit 25.

Preferably a valve B1, preferably an electrically-controlled valve, controlled by control unit 18 in a way similar to that provided for valve A1, is provided in the course of second conduit 29.

Valve B1 may also be replaced or supplemented by a restriction B2, for example a restriction which has been calibrated, designed and experimentally checked.

According to a second embodiment it is provided that valve B1 (FIG. 1b) is for example a three-way valve capable of alternately feeding two conduits, second conduit 29 and a third conduit 29b respectively.

Figure 1C:
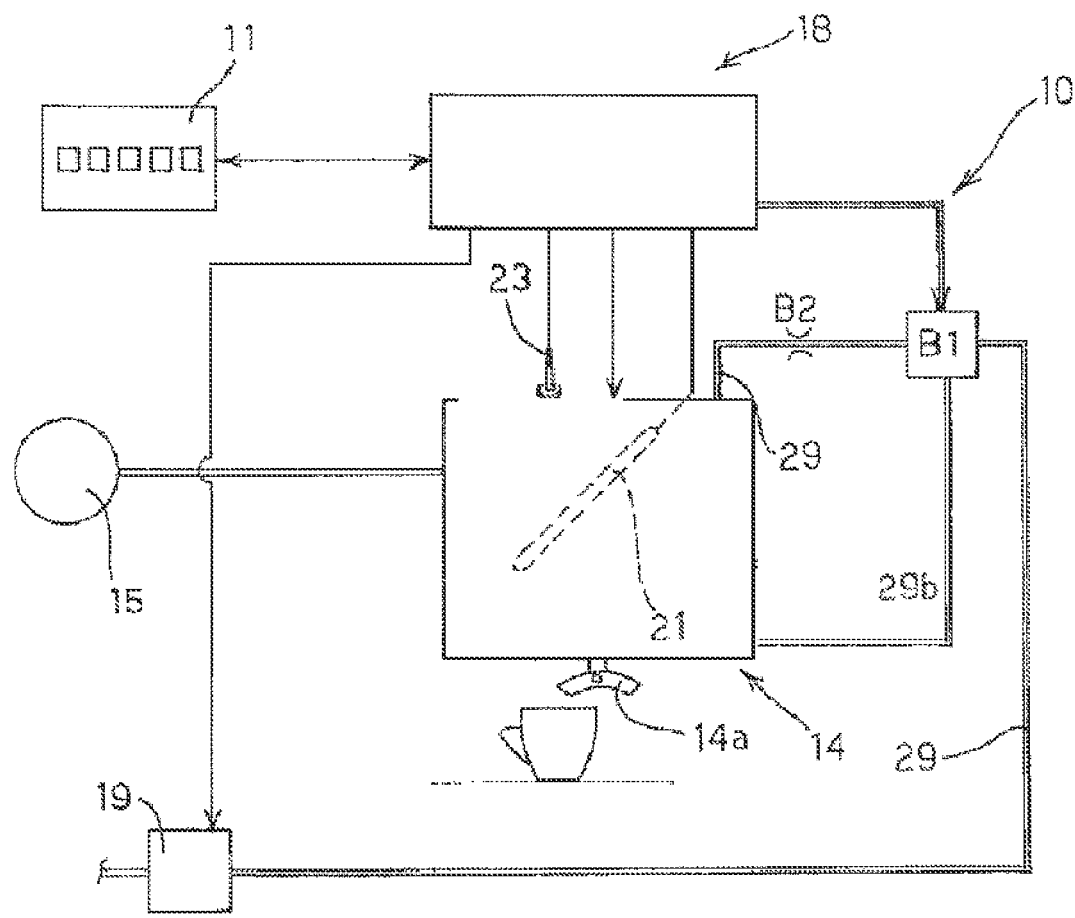
Figure 2:
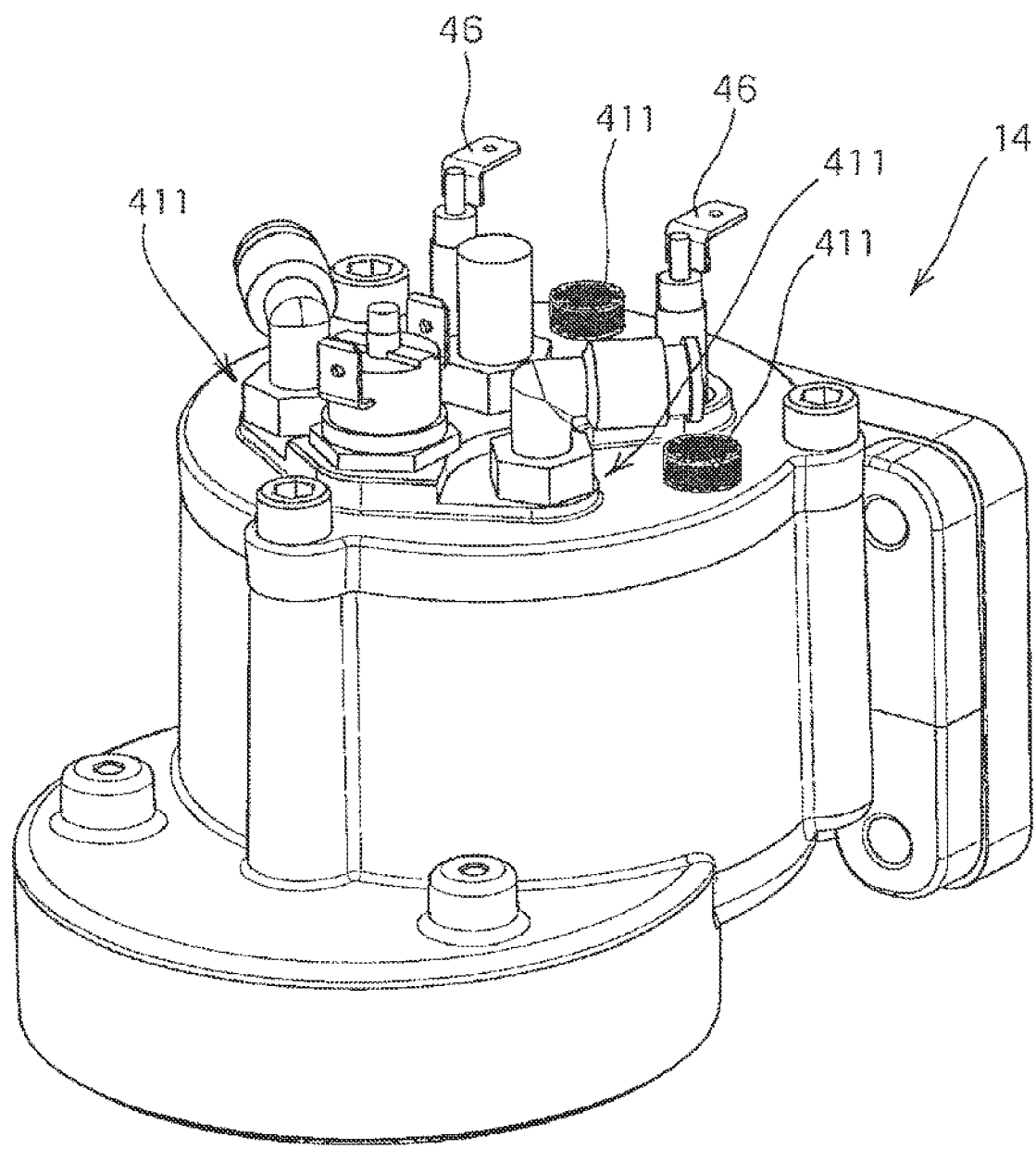
FIG. 2 shows a diagrammatical perspective view of a brew group in the machine in FIG. 1*a* or 1*b*.

According to a third embodiment, shown as an example in FIG. 1c, it is provided that for example boiler 12 and first conduit 25 are not present in the machine, and only the second and third conduits, 29 and 29b respectively, are provided.

According to this embodiment it is provided that heating of the liquid required for infusion is performed only in the close vicinity of each brew group 14 in a single heating stage.

According to yet another embodiment it is provided that second conduit 29 is for example connected to a second pump 19a (FIG. 1a, FIG. 1b) and to a container of aromatic liquid such as to permit the brew group to be fed with the aromatic liquid.

In the rest of the description, for the sake of simplicity reference will be made to the first and second embodiments, which are considered preferable, in which it is provided that the brew group is fed with water through conduits 25 and 29 or 25 and 29 or 29b (FIG. 1a or 1b), unless indicated otherwise.

In all the embodiments brew group 14 preferably comprises a holding chamber 41 (FIG. 1a, FIG. 1b, FIG. 1c, FIG. 2, FIGS. 3a and 3b) which is capable of containing within it the liquid, for example water, which is to be used for the preparation of coffee, and an infusion chamber 43 capable of being fed from holding chamber 41 through a valve 48 when preparation of coffee is required, to deliver espresso coffee to a coffee cup through a conduit 43b. In this embodiment infusion chamber 43 provides infusion means for preparation of the infusion.

According to other embodiments the infusion chamber may not be present and may be replaced by conduit 43b arranged in such a way as to be incorporated in brew group 14 and be capable of providing the infusion means for preparation of the infusion under the control of valve 48, for example an electrically-controlled valve of a known type.

If infusion chamber 43 is present, this is preferably contained within holding chamber 41 and operates in a known way under the control of electrically-operated valve 48.

Even more preferably holding chamber 41 and infusion chamber 43 form a brew group 14 in which infusion chamber 43 is concentric with holding chamber 41 or is incorporated into holding chamber 41.

These latter two embodiments, which are considered preferable, provide that infusion chamber 43 is filled with water for dispensing during the process of preparing the coffee beverage.

This makes it possible to perform a progressive infusion through the application of an increasing pressure to the layer of coffee.

In fact the increase in pressure is determined by the fact that the dispensed water requires a certain time to fill the infusion chamber and therefore gives rise to a slow pressure increase within the infusion chamber during that time.

The pressure preferably increases up to a value corresponding to the maximum value generated by pump 19 or the pumps connected to the conduits, for example 9 bar.

The method of extraction which provides for the presence of an infusion chamber is therefore preferable in that it permits better utilisation of the organoleptic properties of the coffee and on the other hand the presence of an infusion chamber 43 within or concentric with holding chamber 41 makes it possible to achieve the aim of optimising energy efficiency in the circulation of water between the holding chamber and the infusion chamber and continuous control of the temperature of the water reaching the layer of coffee. Holding chamber 41 comprises a temperature detector or sensor 45 and a heating element 46 of predetermined power connected to control unit 18 in a known way.

According to the various embodiments the heating element can generally raise the temperature of the water delivered to holding chamber 41 to optimum values for the preparation of espresso coffee, for example values of between 88 and 93° C.

Figure 3A:
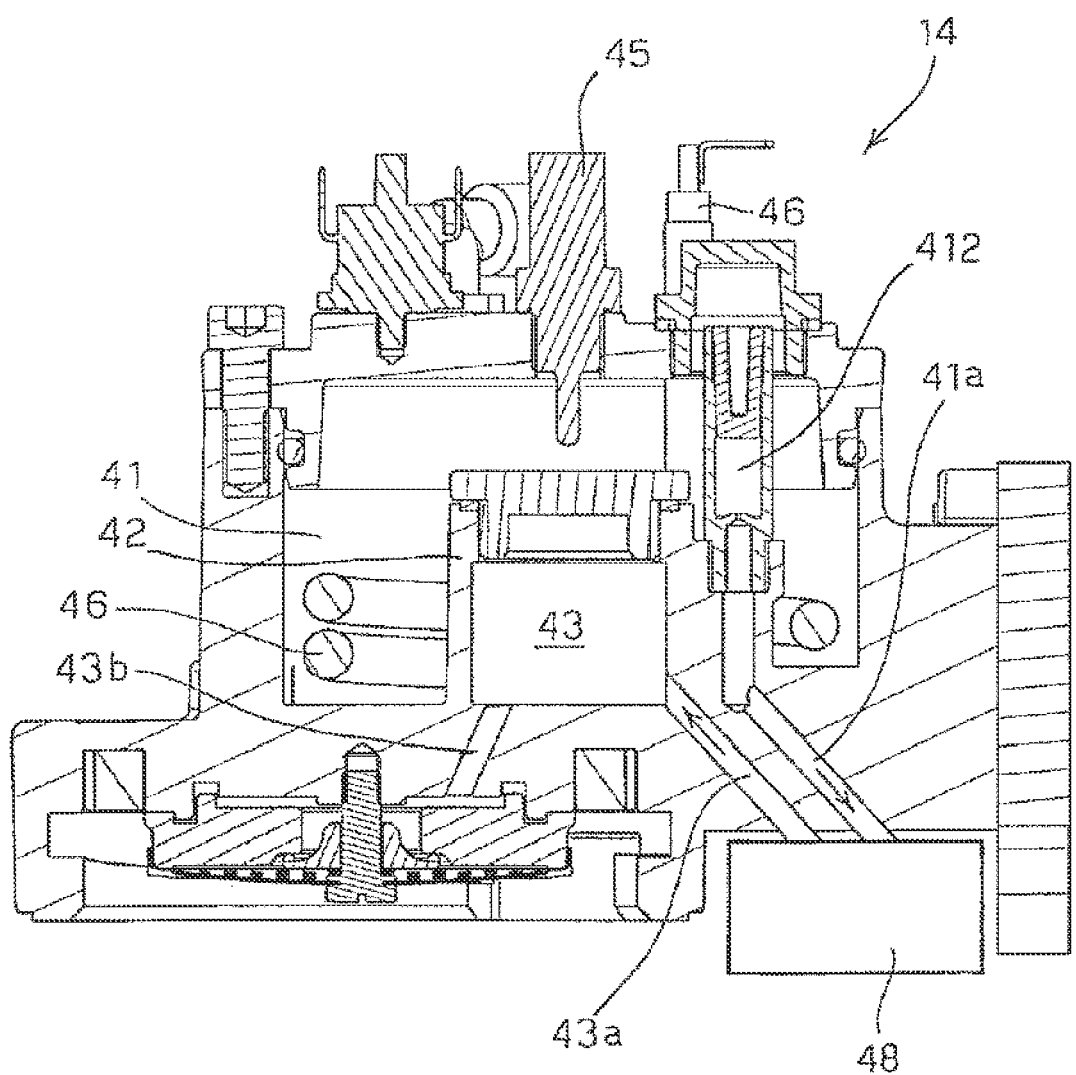
FIGS. 3A and 3B show diagrammatical views in cross-section of the brew group in FIG. 2.
Figure 3B:
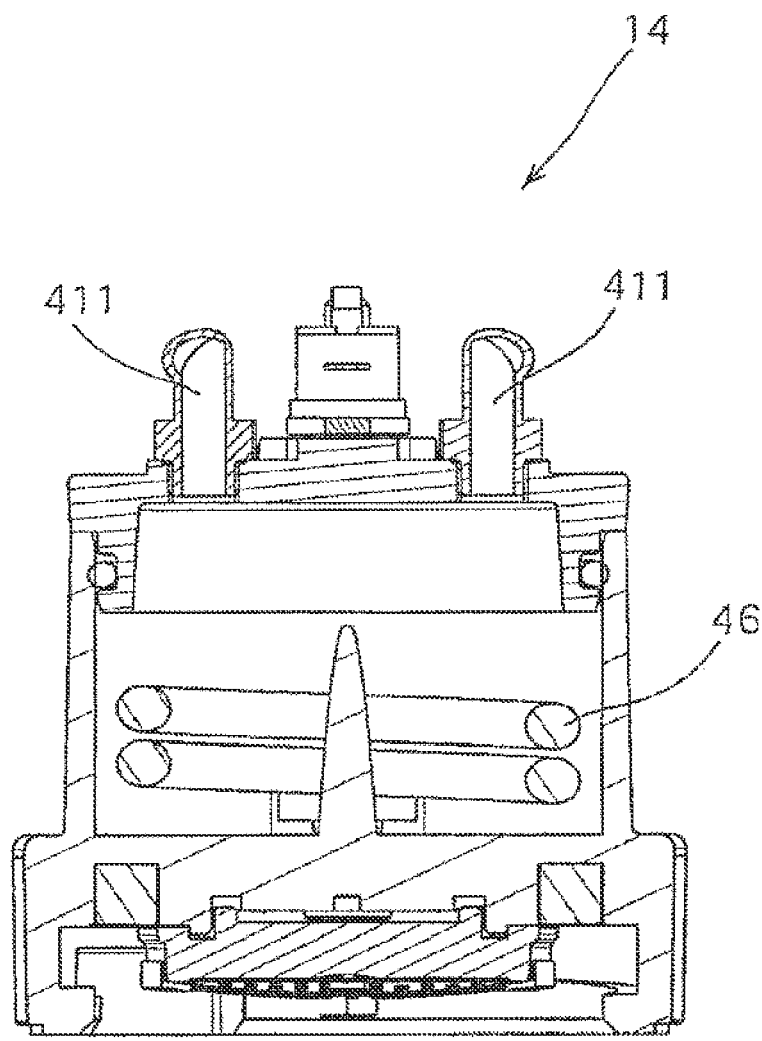

Preferably heating element 46 is arranged in such a way that it is distributed within entire holding chamber 41 or part thereof; for example, as shown in FIG. 3B the heating element may have the shape of a partly closed ring.

Preferably holding chamber 41 has an internal volume that is small in comparison with the power that can be provided by heating element (resistance) 46 such as to allow instantaneous control of the water temperature.

In the various embodiments holding chamber 41 is connected to the infusion chamber in a known way through an outlet conduit 41*a* from chamber 41, electrically-operated valve 48 and an inlet conduit 43*a* into infusion chamber 43.

According to other embodiments in which the infusion chamber is not present, conduit 43*b*, which provides the infusion means, is directly connected to conduit 43*a* and from there to electrically-operated valve 48, as in the various embodiments.

In the preferred embodiments brew group 14 comprises a plurality of inlets or inlet connections 411 which can be connected to first conduit 25 and second conduit 29 respectively, or, if there are more than two inlet connections, to first conduit 25, second conduit 29 and third conduit 29*b*.

The presence of several inlet connections may also offer flexibility in the connection of conduits 25 and 29 or 25, 29 and 29*b* to brew group 14.

This latter configuration, which provides a plurality of inlets 411 which can be selected from time to time at the time of assembly in such a way as to be connected to the first and second conduit individually or otherwise, or, in the case of more than two inlet connections, to the first, second and third conduit, makes it possible in particular to:

optimise the arrangement of connections to the first and second conduit from time to time or, in the case of more than two inlet connections, to the first, second and third conduit, according to the internal configuration of machine 10;

select means for mixing cold water and hot water within holding chamber 41 in such a way as to affect achieving a particular extraction or infusion profile for the coffee according to the arrangement and throughputs of the connections; in fact selected mixing means will affect the extraction profile in that the temperature of the water within holding chamber 41 and subsequently in contact with the layer of coffee will differ according to the arrangement and throughput of connections 25, 29 and/or 29*b*.

As already anticipated, the presence of more than two inlet connections 411 will for example in the case of the second and third embodiments make it possible to connect second conduit 29 and third conduit 29*b* as outlets from valve B1, which is preferably a three-way valve, to inlets 411 in positions which are at a distance from each other so as to allow the possibility of mixing hot and cold water in different ways.

According to these embodiments the three-way valve may also be replaced by two valves and by two separate conduits for the cold water.

The second and third embodiments nevertheless ensure that the infusion temperature can be dynamically controlled as will be more specifically described below.

In all cases, in the preferred embodiments holding chamber 41 has a plurality of inlets 411 of which at least two are connected to conduits 25 and 29 respectively (FIG. 1*a*, FIG. 1*b*, FIG. 2, FIG. 3A, FIG. 3B).

Holding chamber 41 also preferably provides an outlet 412 located within the holding chamber, for example within the top of the interior thereof.

The positioning of outlet 412 at the top of holding chamber 41, which is preferable, makes it possible to maximise the mixing of water during the delivery stage and maintain an instantaneous uniform temperature in holding chamber 41.

According to the second embodiment it is also possible to connect second conduit 29 to holding chamber 41 at a distance from outlet 412 and third conduit 29*b* in a position close to outlet 412.

The solution described above is also preferably applied to the third embodiment.

This configuration makes it possible to influence the change in temperature of the water within holding chamber 41 in a different way according to the manner in which valve B1, for example a three-way valve, is operated.

In the preferred embodiments holding chamber 41 has inner walls 42 configured in such a way as to form the outer walls of infusion chamber 43, either entirely or in part.

This preferable configuration makes it possible to minimise temperature variations between the water present in the holding chamber and that delivered during the stage of preparing coffee, in which the water keeps the inner wall or common wall 42 between the holding chamber and the infusion chamber at the temperature determined by resistance 46 which is controlled by control unit 18.

Using configurations of brew group 14 as described and for example providing holding chamber 41 with a capacity equal to that necessary for the preparation of two cups of coffee (approximately 100 cc) and resistance 46 with a power of 200 W, the Applicant has found by experiment that it is possible to control temperature variations, both upwards and downwards, of at least 1° C. every 5 seconds while espresso coffee is being dispensed.

For example, taking as a reference the fact that the mean time for the dispensing of an espresso coffee is approximately 25-30 seconds, as known to those skilled in the art, and that heating element 46 has in any event a minimum heating inertia, the Applicant has experimentally found that arrangement of brew group 14 as described allows temperature differences or variations within a range or temperature field of +/−4-5 degrees to be controlled dynamically while the coffee is being dispensed.

These temperature variations may be controlled by means of control unit 18 and resistance 46 connected thereto, by setting suitable parameters and storing them in memory within unit 18 and associating those parameters with one or more keys on keyboard 11 such as to have different characteristics for the dispensing of espresso coffee or a particular type of infusion.

In particular, bearing in mind that the specialist literature in the field of coffee machines identifies a constant temperature of between 88 and 93° C. as the optimum temperature for the water performing the infusion on the layer of coffee, it follows that in order to achieve this result the following values should preferably be used as reference values for the temperature of the water delivered by conduits 25, hot water, and 29 and/or 29*b*, cold water, to brew group 14:

Cold water temperature: 110° C.;

Temperature of the hot water or other liquid: 20° C.;

these values being used as reference parameters for dynamic control of temperature changes or variations within the temperature range or field of +/−4-5 degrees, between for example 88 and 93° C. during dispensing of the coffee.

According to the first embodiment the parameters affect the flow in each of the two conduits determined by means of valves A1 and B1 and/or constrictions A2 and B2 respectively.

According to the second embodiment it is for example provided that the temperature of the water within the holding chamber be controlled by also suitably controlling the operation of valve B1.

In particular the delivery of water through conduit 29 makes it possible to control the temperature of the delivered water in a fine way through heating element 46, while delivery through conduit 29b makes it possible to reduce the effect of heating element 46 on the temperature of the water.

This temperature control effect may also be achieved through the third embodiment in that conduit 29 makes it possible to obtain fine control of the temperature of the water delivered through heating element 46, while delivery through conduit 29b makes it possible to reduce the effect of heating element 46 on the water temperature.

The Applicant has also observed that the overall configuration of the machine as described in the first and second embodiments, which provides for the presence of a heat exchanger 24 in boiler 12 and brew groups 14 which are separate and provided with respective or corresponding holding chambers 41, makes it possible to reduce the overall power required for operation of machine 10 in comparison with that generally provided for machines equipped with a single heating stage located in the boiler.

In fact, while known machines having a single heating stage require a power of approximately 700 Watts to deliver two cups of espresso coffee from a brew group, machine 10 according to this invention substantially requires a power of approximately 200 Watts delivered by heating element 46 to deliver two cups from a brew group.

The Applicant has also observed that advantageously each brew group 14, being independent of other brew groups which may be present in machine 10, can be kept switched on or switched off according to the volume of activity required, without this affecting the activity of services devices 15 or other brew groups.

In the case of the third embodiment it is for example sufficient to maintain only one brew group accessible or on stand-by.

The Applicant has also observed that the provision of a plurality of inlets 411 for delivering water to holding chamber 41 offers the possibility of deciding where to position the inlet or the inlets of cold water with respect to that or those deriving from the source of hot water.

The preferred embodiments described in fact allow the possibility of deciding how the two fluids should be mixed according to the desired extraction profile and/or convenience of assembly.

In fact when two inlets 411 to holding chamber 41 of each brew group 14 are preferably used, the fact of having provided several inlets in the embodiment allows the possibility of using several inlets or selecting the most preferable ones from the various inlets during the stage of machine assembly on the basis of the desired extraction profile and/or convenience of assembly.

The Applicant has finally observed that the use of at least two inlets in the preferred embodiments also brings further advantages such as for example:

the possibility of using different valves, A1 and B1 respectively, for every two inlet conduits, 25 and 29, or three conduits 25, 29 and 29b to brew group 14. This solution in fact allows the possibility of controlling the two valves through specific software with consequent immediate variation in the coffee extraction profile; in addition to this, according to these embodiments, the water in the conduits can be controlled in such a way as to have a minimum volume which can be directly controlled by the valves;

the possibility of reducing the hydraulic connections between the conduits within the machine, with a consequent reduction in costs and an increase in its overall reliability;

the possibility of using different liquids, for example hot water originating from heat exchanger 24 via conduit 25 and a liquid, for example of the aromatic type, at ambient temperature originating from conduit 29, in this case connected to a container of aromatic liquid. This embodiment, which possibly has several inlets available, is undoubtedly advantageous in market contexts where it is foreseeable that an aromatic liquid, preferably at ambient temperature so as not to spoil its characteristics, may be added to the water immediately before preparation of the coffee-based infusion.

Machine 10 according to the invention operates as follows.

When machine 10 is not active, brew groups 14 are switched off or, alternatively, are in a low consumption condition (stand-by).

The stand-by condition may be arranged in such a way that the water in the brew group in all the embodiments is kept at a moderately low temperature, for example 60° C., or at a temperature close to the optimum values for the preparation of espresso coffee, for example 88° C., at a predetermined pressure.

When at least part of brew group 14 is in a dispensing condition, following the activation of for example a suitable key on keyboard 11, control unit 18 proceeds if necessary to switch on heating element 46 of holding chamber associated with infusion chamber 43 from which the dispensing of espresso coffee is required, on the basis of program modules placed in the memory thereof during the stage of design of the machine, and once the initial dispensing temperature is reached, operates electrically operated valve 48 in such a way that the water passes from holding chamber 41 to infusion chamber 43 and there to the coffee cup.

Of course the initial temperature of the holding chamber may be that necessary for infusion, as provided for example in one of the possible stand-by conditions, in which activation of the appropriate key may bring about immediate operation of electrically-operated valve 48.

In the course of dispensing, control unit 18 will if so provided control the temperature of the water by varying it within a predetermined range on the basis of programs placed in its memory to obtain espresso coffee having characteristics depending upon the programming of control unit 18 through various extraction profiles.

It is pointed out here that in this description by the term "extraction profile" is meant the course of the temperature which extracts the coffee in relation to the dispensing time. The temperature may be constant, increasing, decreasing, etc., with respect to time and may control the quality of coffee extraction.

If for example a decreasing extraction profile is used for the temperature course, a less bitter and astringent coffee will be obtained, as the elements which give rise to these taste factors (typically given up to the water by the coffee powder towards the end of delivery) are extracted less vigorously.

Of course if an increasing extraction profile is used for the temperature course, the opposite effect will be obtained.

Thanks to the brew group as described in the various embodiments it is therefore possible to obtain extraction profiles which can be varied through control unit 18.

In fact thanks to the structure of brew group 14 as described it is possible to apply control thereto in such a way as to have a constant temperature profile during the dispensing of coffee, or a varying temperature profile.

Control strategies may be applied through the control unit in various ways such as for example:

switching off heating element 46 or keeping it switched on in order to have a decreasing or increasing delivery temperature respectively, or modulating the operation of valves A1 and B1, if present, so as to control and regulate the flow of hot and cold water within the holding chamber of the brew group at will, and as a consequence the extraction profile in any of the first, second or third embodiments, or using heating element 46 and valves A1 and B1, if present, in combination to control and regulate the extraction profile.

To sum up, as a result of the provision of a holding chamber 41 corresponding to each infusion chamber 43 it is possible to control the temperature at which water is dispensed, and as a consequence the characteristics of the espresso coffee in terms of taste and quality, through different extraction profiles.

If the embodiment providing for delivery of different liquids to the holding chamber, for example water and aromatic liquid, is used, delivery of the corresponding liquids may be controlled by valves A1 and B1 in such a way as to suitably meter the quantities of the various liquids.

Of course obvious modifications and/or variants of the above description are possible in respect of form, materials, components and connections and in the construction details illustrated and in the method of operation without departing from the invention as specified in the following claims.

The invention claimed is:

1. Brew group connectable to a boiler of an infusion machine, said brew group comprising:
   infusion means provided for the preparation of infusions;
   a holding chamber in fluid connection with said infusion means comprising:
      at least two liquid inlets configured to permit entry into the holding chamber of liquids having a first and a second temperature, and
      a heating element, configured to directly heat the liquids contained in said holding chamber so as to hydraulically feed said infusion means with the heated liquids for the preparation of infusions; and
   wherein said at least two inlets comprise at least a first liquid inlet configured to deliver a first liquid at said first temperature, and at least a second liquid inlet configured to deliver a second liquid at said second temperature, said second temperature being higher than said first temperature.

2. Brew group according to claim 1, characterised in that said infusion means comprise an infusion chamber.

3. Brew group according to claim 2, characterised in that said holding chamber comprises said infusion chamber within it.

4. Brew group according to claim 2, characterised in that said infusion chamber is concentric with said holding chamber or incorporated into said holding chamber.

5. Brew group according to claim 1, in which said heating element is arranged in such a way as to be distributed within all or part of the holding chamber.

6. Brew group according to claim 1, in which said holding chamber comprises at least a third liquid inlet and an outlet conduit located in proximal positions, said third inlet being controlled by a liquid inlet valve for dynamic control of the temperature of the liquid within the holding chamber.

7. Brew group according to claim 2, in which said holding chamber comprises at least a third liquid inlet and an outlet conduit located in proximal positions, said third inlet being controlled by a liquid inlet valve for dynamic control of the temperature of the liquid within the holding chamber.

8. Brew group according to claim 4, in which said holding chamber comprises at least a third liquid inlet and an outlet conduit located in proximal positions, said third inlet being controlled by a liquid inlet valve for dynamic control of the temperature of the liquid within the holding chamber.

9. Brew group according to claim 1, in which said first liquid and said second liquid are water.

10. Brew group according to claim 2, in which said first liquid and said second liquid are water.

11. Brew group according to claim 4, in which said first liquid and said second liquid are water.

12. Brew group according to claim 1, in which said infusion temperature lies between said first temperature and said second temperature.

13. Brew group according to claim 2, in which said infusion temperature lies between said first temperature and said second temperature.

14. Brew group according to claim 4, in which said infusion temperature lies between said first temperature and said second temperature.

15. Brew group according to claim 1 in which
    said heating element is configured to be controlled dynamically to vary the temperature of the liquids in a range of at least 5 degrees during the preparation of an infusion.

16. Brew group according to claim 2 in which
    said heating element is configured to be controlled dynamically to vary the temperature of the liquids in a range of at least 5 degrees during the preparation of an infusion.

17. Brew group according to claim 4 in which
    said heating element is configured to be controlled dynamically to vary the temperature of the liquids in a range of at least 5 degrees during the preparation of an infusion.

18. Machine for the preparation of infusions, comprising:
    at least one feed device configured to feed liquid to the said machine;
    a boiler having a first heating element arranged to heat a liquid suitable for the preparation of infusions, said liquid being provided by means of said at least one feed device;
    at least one brew group comprising a second heating element and configured according to claim 1.

19. Infusion machine according to claim 18, comprising
    a control unit connected to the said second heating element and configured to dynamically control said second heating element to dynamically vary the infusion temperature during preparation of the infusion.

20. Method for operating a machine for the preparation of infusions, said machine comprising at least one liquid feed device, at least one boiler having a first heating stage and at least one brew group having a second heating stage, the method comprising the steps of:
    heating a first liquid with said first heating stage;
    delivering said first liquid to said brew group at a first temperature through at least a first inlet connected to said boiler;
    delivering a second liquid to said brew group at a second temperature through at least a second inlet;
    heating the liquids contained in said brew group to temperature values corresponding to the infusion temperature by means of the second heating stage.

21. Method according to claim 20, comprising the further step of
    providing control means for dynamic control of the infusion temperature within a specific temperature range through said second heating stage during the preparation of infusions, said temperature range lying between said first temperature and said second temperature.

22. Method according to claim 20, in which said first liquid and said second liquid are water.

23. A brew group connectable to a boiler of an infusion machine, said brew group comprising:
- infusion means for the preparation of infusions;
- a holding chamber in fluid connection with said infusion means and comprising:
  - at least two liquid inlets configured to permit entry of liquids having a first temperature and a second temperature, and
  - a heating element, configured to directly heat the liquids contained in said holding chamber so as to hydraulically feed said infusion means with said heated liquids for the preparation of infusions;
- wherein said heating element is distributed within all or part of the holding chamber.

24. The brew group according to claim 23, wherein said holding chamber comprises at least a third liquid inlet and an outlet conduit, said third inlet controlled by a liquid inlet valve for dynamic control of the temperature of the liquid within the holding chamber.

* * * * *